United States Patent
Wenzler

(10) Patent No.: US 8,229,697 B2
(45) Date of Patent: Jul. 24, 2012

(54) METHOD AND DEVICE FOR THE ROBUST AND EFFICIENT DETERMINATION OF THE ROTATIONAL DIRECTION AND/OR ROTATIONAL SPEED OF A WHEEL OR A SHAFT

(75) Inventor: Axel Wenzler, Rottweil (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 12/674,529

(22) PCT Filed: Sep. 19, 2008

(86) PCT No.: PCT/EP2008/062537
§ 371 (c)(1),
(2), (4) Date: Feb. 22, 2010

(87) PCT Pub. No.: WO2009/043739
PCT Pub. Date: Apr. 9, 2009

(65) Prior Publication Data
US 2011/0054832 A1    Mar. 3, 2011

(30) Foreign Application Priority Data
Sep. 27, 2007 (DE) .......................... 10 2007 046 308

(51) Int. Cl.
*G06F 15/00* (2006.01)
*G01P 3/00* (2006.01)
(52) U.S. Cl. .......... 702/147; 702/96; 702/142; 702/145; 702/148; 702/149; 702/189; 702/194; 702/197; 702/198; 73/1.37; 73/488
(58) Field of Classification Search .................... 702/96, 702/142, 145, 147–149, 189, 194, 197, 198; 73/1.37, 488
See application file for complete search history.

(56) References Cited

U.S. PATENT DOCUMENTS
2003/0145663 A1   8/2003   Heisenberg et al.
2004/0015307 A1*  1/2004   Heisenberg ..................... 702/72

FOREIGN PATENT DOCUMENTS
DE    101 42 449    3/2002
EP    1 172 656     1/2002
JP    3111765       5/1999

* cited by examiner

Primary Examiner — Sujoy Kundu
(74) Attorney, Agent, or Firm — Kenyon & Kenyon LLP

(57) ABSTRACT

A method and a device are described for determining the rotational direction and/or rotational speed of a rotatable body on the basis of a sine signal and cosine signal, which is assignable to the rotational direction and/or rotational speed of the rotatable body and are output by a sensor, having at least one of the following steps: recording a sine signal and cosine signal, which is assignable to the rotational direction and/or rotational speed, at a point in time; determining a phase value from the sine signal and cosine signal; recording sine signals and cosine signals, which is assignable to the rotational direction and/or rotational speed, at points in time; determining phase values from the corresponding sine signals and cosine signals; calculating phase differences from the phase values and the phase value; and determining the rotational direction and/or rotational speed from the phase differences on the basis of a Vernier method.

10 Claims, 4 Drawing Sheets

METHOD AND DEVICE FOR THE ROBUST AND EFFICIENT DETERMINATION OF THE ROTATIONAL DIRECTION AND/OR ROTATIONAL SPEED OF A WHEEL OR A SHAFT

FIELD OF THE INVENTION

The present invention relates to a method for the robust and efficient determination of the rotational direction and/or rotational speed of a wheel or a shaft. Furthermore, the present invention relates to a device for executing a method for the robust and efficient determination of the rotational direction and/or rotational speed of a wheel or a shaft.

BACKGROUND INFORMATION

In many systems, in particular in the automotive field, very precise and reliable determination of a rotational direction and/or rotational speed, for example, for wheels or shafts, is required. For this purpose, the systems for determining the rotational direction and/or rotational speed analyze one sinusoidal and one cosinusoidal acceleration signal in the form $$x = \cos \phi$$
$$y = \sin \phi.$$

Angle $\phi$ is the instantaneous value of the (rotational) angle of the wheel or the shaft. The sensors are situated at different positions on the rim of the wheel or on the shaft or are sensitive in different directions. Both signals x and y normally have a phase shift of 90° in relation to one another.

Methods are known from the related art which monitor signals x and y and determine the rotational direction of the wheel or the shaft from the sequence of the minima and maxima of the two signals. For example, it is possible to monitor signal x and to detect the point in time at which signal x has the first zero crossing after a maximum. If signal y has a maximum at this point in time, the wheel or the shaft rotates in the positive direction of $\phi$. If signal y has a minimum at this point in time, in contrast, the wheel or the shaft rotates in the negative direction of $\phi$.

However, these methods have certain disadvantages. In general, the detected signals are subject to offsets, i.e., to a constant component, or have interference of another type, whereby the detection of the minima, maxima, and zero crossings, which is required during the entire monitoring time, proves to be problematic. Because of the long monitoring time, the analysis circuit used has increased power consumption, because it must be continuously powered. Furthermore, the above-mentioned methods only provide information about the rotational direction, but not additional information such as the rotational frequency, etc.

Therefore, the need exists for an improved method for efficient determination of the rotational direction and/or rotational speed of a rotatable body.

It is therefore the object of the present invention to provide a method for the efficient determination of the rotational direction and/or rotational speed of a rotatable body which avoids the above-mentioned disadvantages. This object is achieved by the subject matter of Claim 1.

A further object of the present invention is to provide a device for the efficient determination of the rotational direction and/or rotational speed of a rotatable body. This object is achieved by the subject matter of Claim 8.

Furthermore, the present invention has the object of providing a computer program which executes all steps of the method according to the present invention when it runs on a computing device. This object is achieved by the subject matter of Claim 9.

A computer program product having program code, which is stored on a machine-readable carrier, for performing the method according to the present invention when the program is executed on a computer or control unit is the subject matter of Claim 10.

Specific embodiments and refinements and supplementary methods are the subject matter of the embodiments and methods described herein.

The method according to the present invention for determining rotational direction and/or rotational speed $\omega$ of a rotatable body on the basis of a sine signal (y) and cosine signal (x), which is assignable to the rotational direction and/or rotational speed of the rotatable body and are output by a sensor, has at least one of the following steps: recording a sine signal ($y_0$) and cosine signal ($x_0$), which is assignable to the rotational direction and/or rotational speed, at a point in time $t_0$; determining a phase value of $\phi_0$ from sine signal ($y_0$) and cosine signal ($x_0$); recording sine signals ($y_i$) and cosine signals ($x_i$), which is assignable to the rotational direction and/or rotational speed, at points in time $t_i$; determining phase values $\phi_i$ from the corresponding sine signals ($y_i$) and cosine signals ($x_i$); calculating phase differences $\Delta\phi_i$ from the phase values $\phi_i$ and the phase value $\phi_0$; and/or determining the rotational direction and/or rotational speed $\omega$ from the phase differences $\Delta\phi_i$ on the basis of a Vernier method.

AMR or GMR sensors (AMR: anisotropic magneto resistance, GMR: giant magneto resistance) may be used as sensors. The sensors each generate a sine signal and a cosine signal, from which the angle to be measured may be calculated in the further processing. Further sensors of the species are, for example, Hall sensors, as well as optical or micromechanical transducers.

Sine signals (y) and cosine signals (x), which may be assigned to the rotational direction and/or rotational speed of the rotatable body, may originate from a single sensor or from multiple sensors. If only one sensor is used, it delivers one sine signal and one cosine signal which is assignable to the rotational direction and/or rotational speed of the rotatable body. If multiple sensors are used, one sensor may output a sine signal which is assignable to the rotational direction and/or rotational speed of the rotatable body, and another sensor may output a corresponding cosine signal.

The sensor signals may be continuous signals and/or discrete signals.

Using suitable methods, in particular the method described in Bosch R. 319810 for efficient offset compensation in angle or phase signals, sine signals (y) and cosine signals (x) output by a sensor may be freed from any signal offsets. This compensation method is described briefly hereafter:

An angle $\alpha$ of angle sensors may be determined on the basis of a sine signal which is assignable to the angle and a cosine signal which is assignable to the angle using the following steps: recording a first value pair $S_0$, having a first sine signal ($y_0$) and a first cosine signal ($x_0$); recording a second value pair S, having a second sine signal (y) and a second cosine signal (x); calculating a third value pair S' from the difference between second value pair S and first value pair $S_0$; and/or determining angle $\alpha$ on the basis of third value pair S'.

Through the determination of angle $\alpha$ on the basis of the difference between the first and second value pairs, the offsets of the recorded cosine signals or sine signals neither have to be determined nor also taken into consideration.

On the basis of the offset compensation described above or the calculated phase difference $\Delta\phi_i$, it is possible to determine the rotational direction and the rotational speed of the rotatable body without knowing the signal offsets.

In a further embodiment according to the present invention, phase values φ may be ascertained from the sine signal (y) and cosine signal (x) with the aid of a CORDIC method (COordinate Rotation Digital Computer) or a series expansion.

In a further embodiment according to the present invention, the points in time $t_i = t_0 + n \cdot \Delta t$ with n, $\Delta t \in N$. n is referred to as the period number and $\Delta t$ as the granularity.

Period number n may be between 5-50, which may between 10-35, and which may between 15-20. Period number n may be adapted to the type of the sensor. The higher the period number, the greater the precision of the method.

Granularity $\Delta t$ may be in the range from 1-50 ms, which may be between 5-30 ms, and which may be between 10-15 ms. Granularity $\Delta t$ may be adapted to the type of the sensor. The selection of the granularity results in the uniqueness range of the rotational frequency determination. At a granularity $\Delta t = 10$ ms, a uniqueness range of ±50 Hz results, which corresponds to a speed range of ±300 km/h. In particular, the granularity or the sampling times may be selected so that both motion detection and also rotational direction recognition are possible.

According to a further implementation of the exemplary embodiments and/or exemplary methods of the present invention, the phase differences $\Delta \phi_i$ correspond to the following expression: $\Delta \phi_i = \omega \cdot t_i \mod 2\pi$, ω corresponding to the rotational direction and/or rotational speed and $t_i$ to the point in time of the measurement.

According to the exemplary embodiments and/or exemplary methods of the present invention, rotational direction and/or rotational speed ω may be determined from phase differences $\Delta \phi_i$ on the basis of a Vernier method. The Vernier method may be a multidimensional Vernier method, a classical Vernier method, a modified Vernier method, or a cascaded, modified Vernier method, as described, for example, in DE 101 42 449 A1 of the applicant.

The use of a multidimensional Vernier method has the following advantages: the robustness of the analysis system is very high. The circuit implementation may be designed extremely efficiently in regard to circuit outlay, computing outlay, and power consumption in relation to conventional approaches. No information is required about signal offsets and rotational frequency. No memory capability must be provided for offsets in the sensor system. The offsets do not have to be ascertained in a separate step at the end of tape or in operation, if, for example, the method described above for efficient offset compensation in angle or phase signals is used.

In the meaning of the exemplary embodiments and/or exemplary methods of the present invention, the rotatable body may be a wheel or a shaft.

The method according to the present invention and the device according to the present invention are suitable in particular for analyzing acceleration sensors (micromechanical or piezoelectric) in tire pressure monitoring systems (TPMS), motion detection, and/or auto-location.

In the device according to the present invention, further circuit parts may be combined in a multiplexing method in various embodiments. It is also possible to construct the device as analog, digital, or from a mixture of analog technology and digital technology.

The present invention is explained in greater detail hereafter as an example on the basis of the appended drawings.

DETAILED DESCRIPTION

Figure 1:
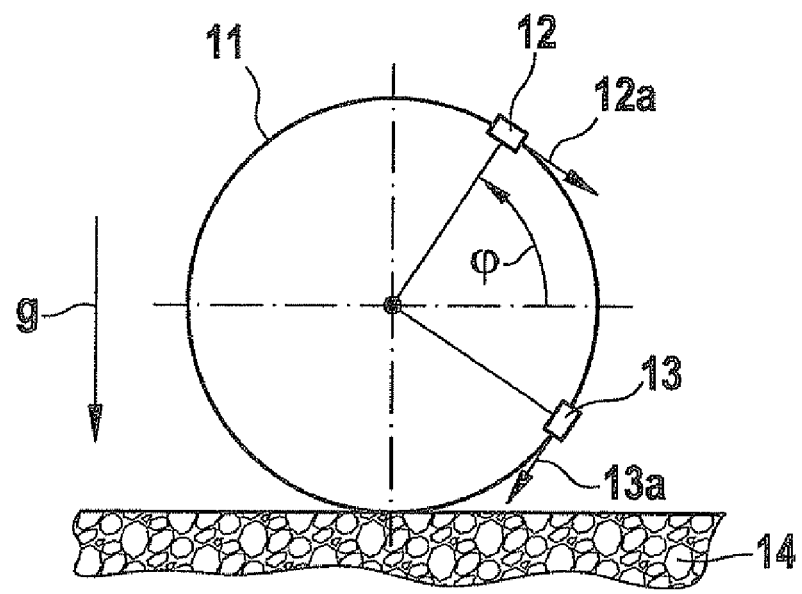
FIG. 1 schematically shows an illustration of a wheel having two acceleration sensors.

FIG. 1 schematically shows a wheel 11, which rolls on a foundation 14. Two acceleration sensors 12, 13 are attached to wheel 11 at two different positions. Acceleration of gravity g acts on wheel 11 and acceleration sensors 12 and 13. There is an angle of 90° or π/2 between the two acceleration sensors. Arrows 12a, 13a indicate the detection direction of acceleration sensor 12, 13, respectively. Acceleration sensor 12 outputs a signal in the form x=cos φ and acceleration sensor 13 outputs a signal in the form y=sin φ.

Figure 2:
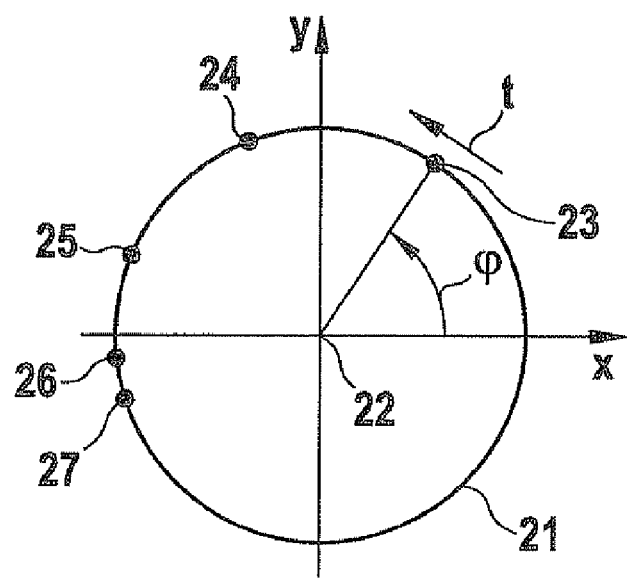
FIG. 2 shows a two-dimensional illustration of signals x and y.

FIG. 2 is a two-dimensional illustration of signals x=cos φ and y=sin φ. As shown, measuring points 23, 24, 25, 26, 27 in the form M(x, y) lie on a circle 21 around origin 22, angle φ between the vector from origin 22 to measuring point M and horizontal axis x being measured.

Figure 3:
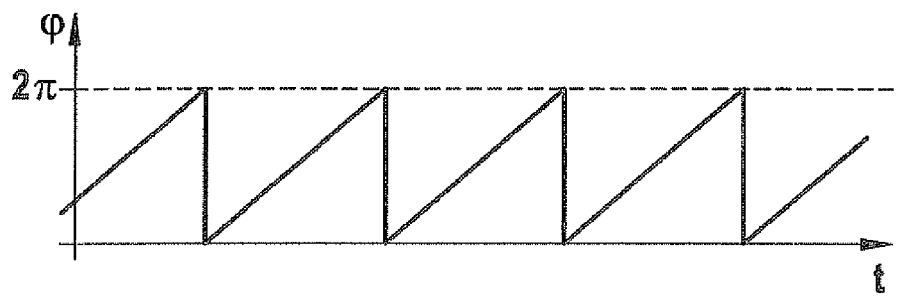
FIG. 3 shows the variation of angle φ during rotational movement.

The curve shown in FIG. 3 corresponds to the variation of angle φ during multiple rotations of wheel 11. A period from 0 to 2π represents one complete rotation.

Figure 4:
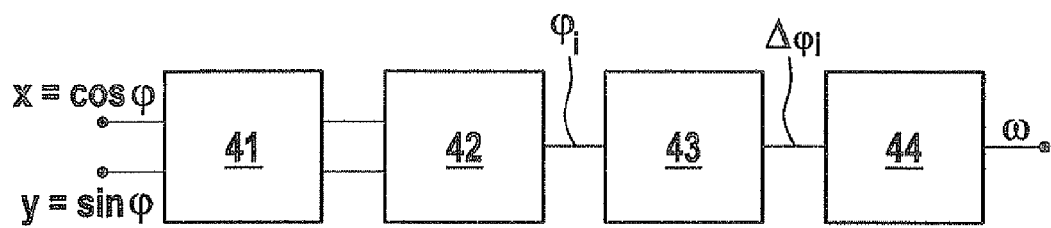
FIG. 4 shows a flow chart of the analysis circuit.

FIG. 4 shows a flow chart of the analysis method according to the present invention. If signals x=cos φ and y=sin φ of acceleration sensors 12, 13 are subject to an offset, it is compensated for in block 41. Subsequently, a phase value $\phi_i$ is ascertained from the offset-compensated signals in block 42 using a tan 2 calculation. A phase differential value $\Delta \phi_i$ is then calculated from phase value $\phi_i$ and phase value $\phi_0$ in block 43. A signed rotational direction and/or rotational speed ω is determined from phase differential value $\Delta \phi_i$ in block 44. These steps are repeated for phase values $\phi_1, \phi_2, \phi_3, \ldots \phi_i$. This is performed on the basis of a Vernier method according to the present invention.

Figure 5:
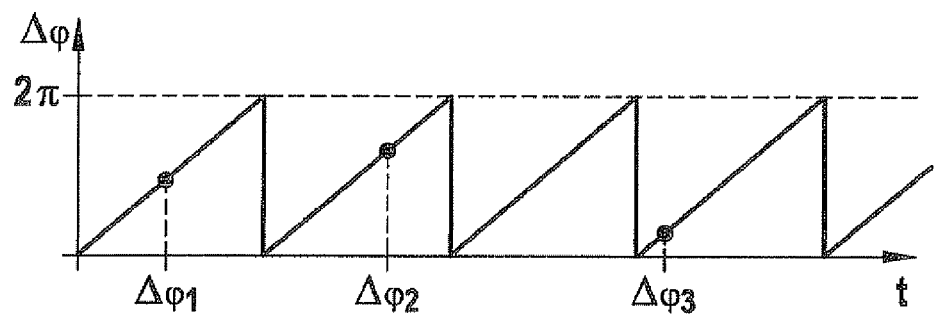
FIG. 5 shows the variation of the phase difference and differential values calculated from the measured values.

FIG. 5 shows the variation of phase differential value $\Delta \phi$ together with differential values $\Delta \phi_1, \Delta \phi_2, \Delta \phi_3$. A period from 0 to 2π represents one complete rotation of wheel 11.

Figure 6:
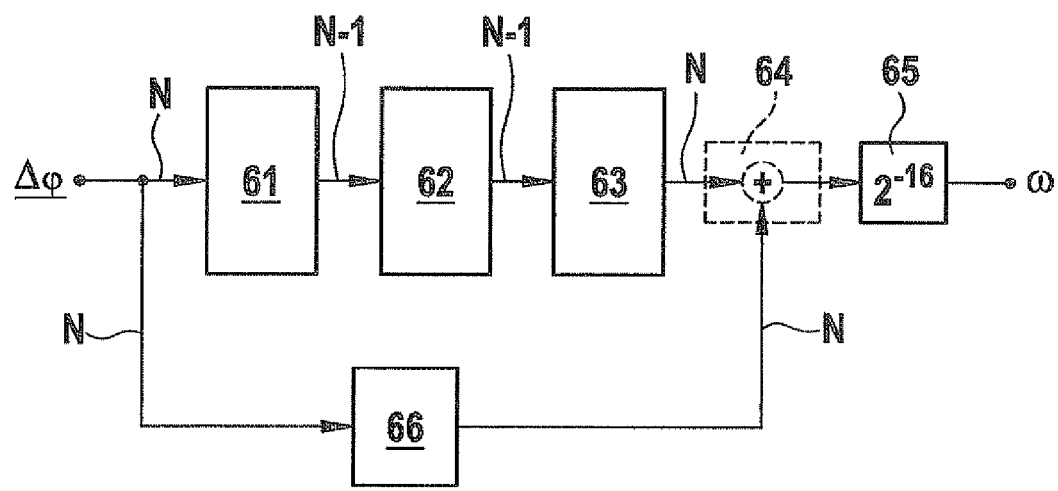
FIG. 6 shows a signal flow graph for the Vernier calculation.

FIG. 6 shows a signal flow graph for the Vernier calculation. In block 61, N phase differential values $\Delta \phi$ are transformed into N−1 mapped values S by linear transformation. In block 62, N−1 mapped values S are converted into N−1 values W by quantization. N−1 quantized values W are subsequently mapped onto N values Z in block 63 by linear transformation. In block 64, N weighted phase differential values $\Delta \phi$ are added to N transformed values Z. In block 65, the sum of N weighted phase differential values $\Delta \phi$ and N values Z is then corrected, which finally results in rotational direction and/or rotational speed ω.

Figure 7:
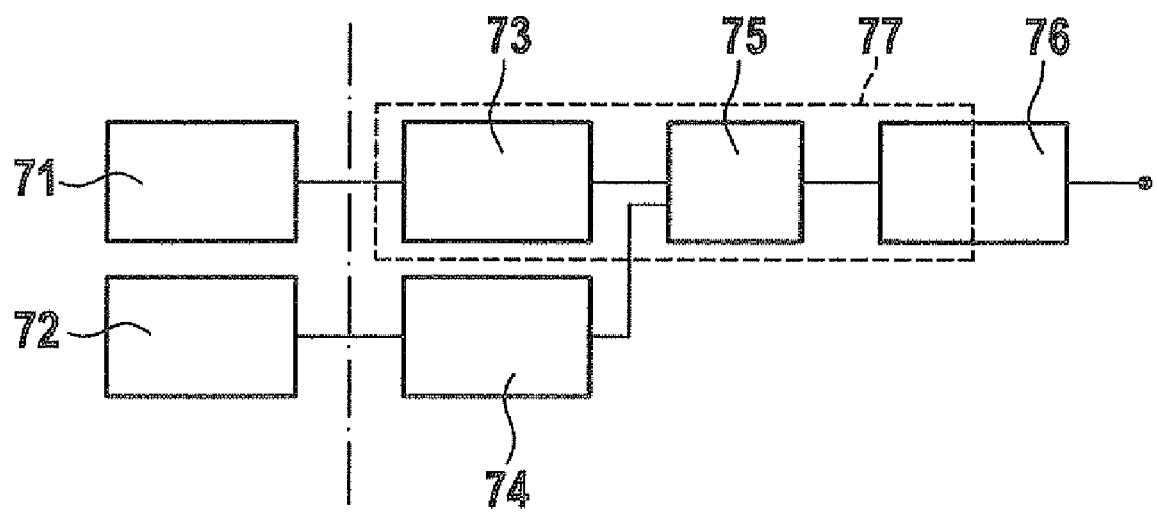
FIG. 7 shows a block diagram of a circuit configuration.

A block diagram of the circuit configuration according to the present invention is shown in FIG. 7, as is used in connection with motion detection (MSI). Sensors 71, 72 record the acceleration of wheel 11 in the form x=cos φ and y=sin φ. The signals are subsequently sampled in sampling units 73, 74, i.e., discrete values are generated from the continuous values. These discrete values are subsequently digitized using an analog-digital converter (A/D converter) 75. The values thus digitized are then further processed in a digital signal processor (DSP) 76, to thus determine a horizontal and/or vertical movement, the rotational direction, and/or the rotational speed of wheel 11. Sampling units 73, A/D converter 75, and DSP 76 may be combined into a motion detection (MSI) unit 77.

What is claimed is:

1. A method for determining at least one of a rotational direction and a rotational speed of a rotatable body comprising:
   determining a phase value $\phi_0$ from a sine signal ($y_0$) and a cosine signal ($x_0$), which are assignable to at least one of the rotational direction and the rotational speed, at a point in time;
   determining phase values $\phi_i$ from the corresponding sine signals ($y_i$) and corresponding cosine signals ($x_i$), which are assignable to the at least one of the rotational direction and the rotational speed, at points in time $t_i$;
   calculating by a processor phase differences $\Delta\phi_i$ from the phase values $\phi_i$ and the phase value $\phi_0$; and
   determining by the processor the at least one of the rotational direction and the rotational speed $\omega$ from the phase differences $\Delta\phi_i$ on the basis of a Vernier method.

2. The method of claim 1, wherein the points in time $t_i = t_0 + n \cdot \Delta t$ with n, $\Delta t \in N$.

3. The method of claim 1, wherein the phase differences correspond to $\Delta\phi_i = \omega \cdot t_i \mod 2\pi$.

4. The method of claim 1, wherein the phase values $\phi$ are ascertained from the sine signal (y) and the cosine signal (x) with the aid of a CORDIC method.

5. The method of claim 1, wherein the following operations are executed by the Vernier method:
   linearly transforming N phase differential values $\Delta\phi$ into N−1 mapped values S;
   quantizing the N−1 mapped values S in N−1 values W;
   linearly transforming the N−1 quantized values W into N values Z;
   adding N weighted phase differential values $\Delta\phi$ to the N transformed values Z; and
   correcting the sum of the N weighted phase differential values $\Delta\phi$ and the N values Z.

6. The method of claim 1, wherein the Vernier method is one of a multidimensional Vernier method, a classical Vernier method, a modified Vernier method, and a cascaded, modified Vernier method.

7. The method of claim 1, wherein the phase values $\phi$ are determined by performing the following:
   recording a first value pair $S_0$, having a first sine signal ($y_0$) and a first cosine signal ($x_0$);
   recording a second value pair S, having a second sine signal (y) and a second cosine signal (x);
   calculating a third value pair S' from the difference of the second value pair S and the first value pair $S_0$; and
   determining the phase value $\phi$ on the basis of the third value pair S'.

8. A device for determining at least one of a rotational direction and a rotational speed of a rotatable body comprising:
   a phase value determining arrangement to determine a phase value $\phi_0$ from a sine signal ($y_0$) and cosine signal ($x_0$), which are assignable to at least one of the rotational direction and the rotational speed at a point in time;
   a phase values determining arrangement to determine phase values $\phi_i$ from corresponding sine signals ($y_i$) and corresponding cosine signals ($x_i$), which are assignable to the at least one of the rotational direction and the rotational speed, at points in time $t_i$;
   a calculating arrangement to calculate phase differences $\Delta\phi_i$ from the phase values $\phi_i$ and the phase value $\phi_0$; and
   a determining arrangement to determine the at least one of the rotational direction and the rotational speed $\omega$ from the phase differences $\Delta\phi_i$ on the basis of a Vernier method.

9. A non-transitory computer readable medium having a computer program, which is executable on a processor, comprising:
   a program code arrangement having program code for determining at least one of a rotational direction and a rotational speed of a rotatable body, by performing the following:
   determining a phase value $\phi_0$ from a sine signal ($y_0$) and a cosine signal ($x_0$), which are assignable to at least one of the rotational direction and the rotational speed, at a point in time;
   determining phase values $\phi_i$ from corresponding sine signals ($y_i$) and corresponding cosine signals ($x_i$), which are assignable to the at least one of the rotational direction and the rotational speed, at points in time $t_i$;
   calculating phase differences $\Delta\phi_i$ from the phase values $\phi_i$ and the phase value $\phi_0$; and
   determining the at least one of the rotational direction and the rotational speed $\omega$ from the phase differences $\Delta\phi_i$ on the basis of a Vernier method.

10. The method of claim 1, wherein the rotatable body is one of a wheel and a shaft.

* * * * *